Jan. 23, 1945.　　M. GOLDSCHMIDT ET AL　　2,367,861
HINGE JOINT
Filed April 1, 1943　　3 Sheets-Sheet 1
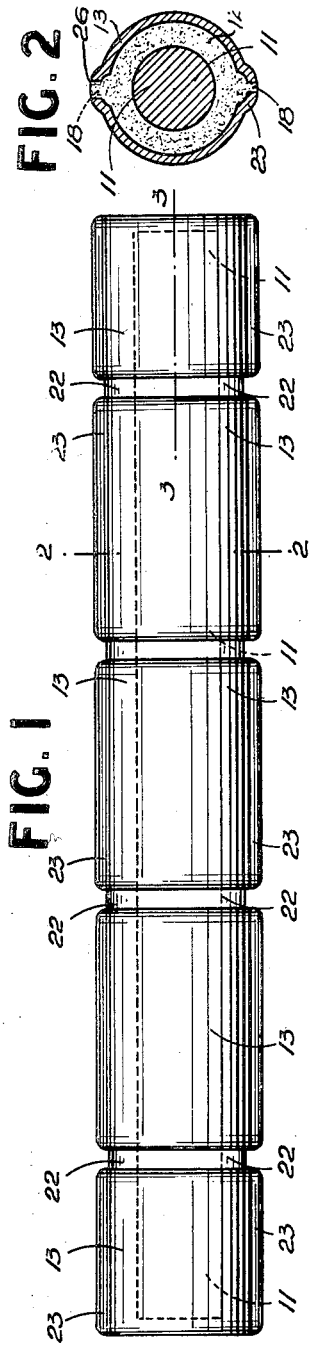
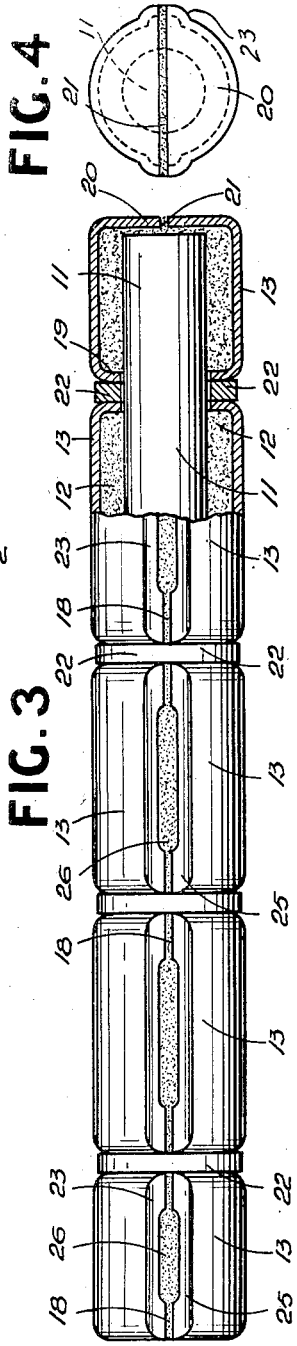
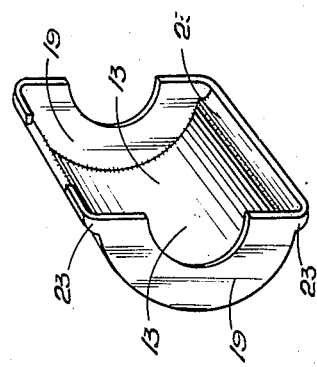
INVENTORS.
Max Goldschmidt,
Jose Enrique Moyal.
BY
Harness, Dickey & Pierce.

Jan. 23, 1945.   M. GOLDSCHMIDT ET AL   2,367,861
HINGE JOINT
Filed April 1, 1943   3 Sheets-Sheet 2
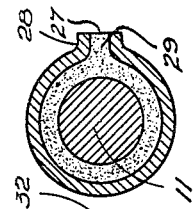
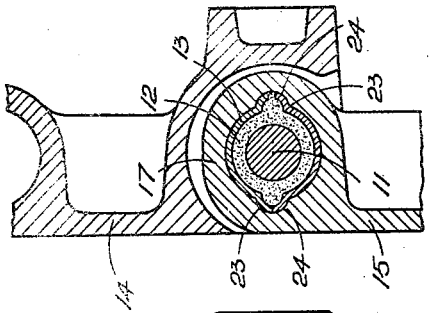
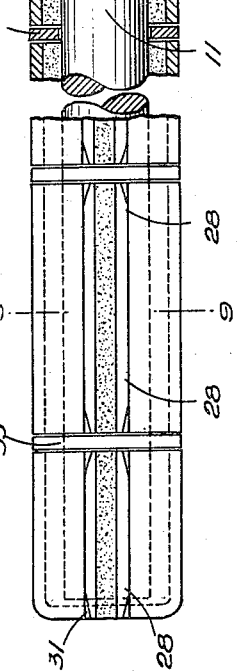
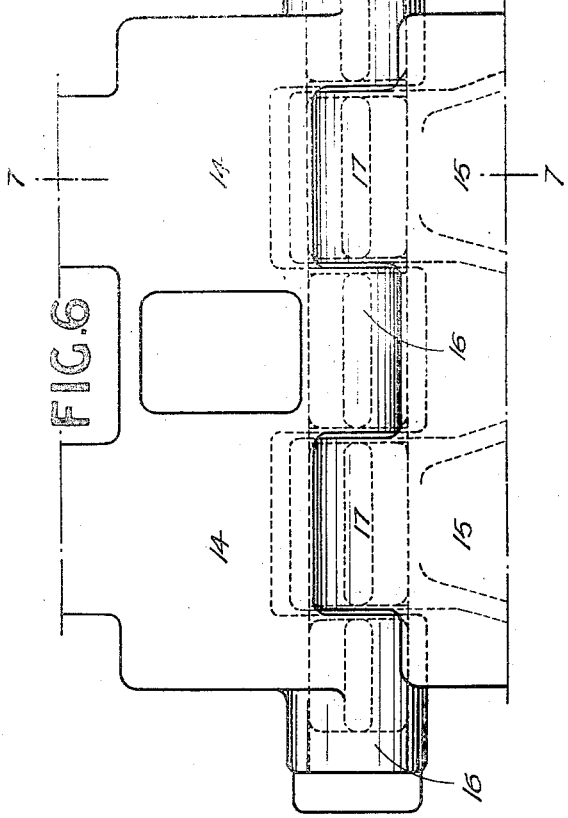
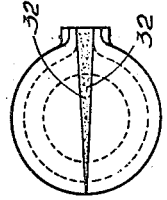
INVENTORS.
Max Goldschmidt,
Jose Enrique Moyal.
BY
Harness, Dickey & Pierce.

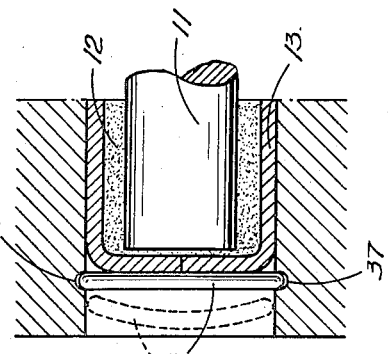
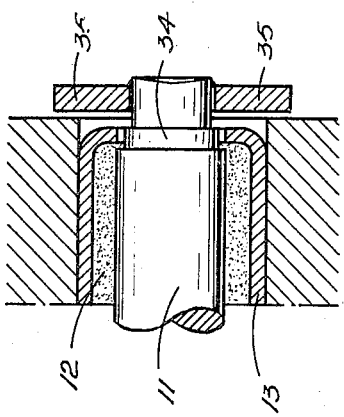
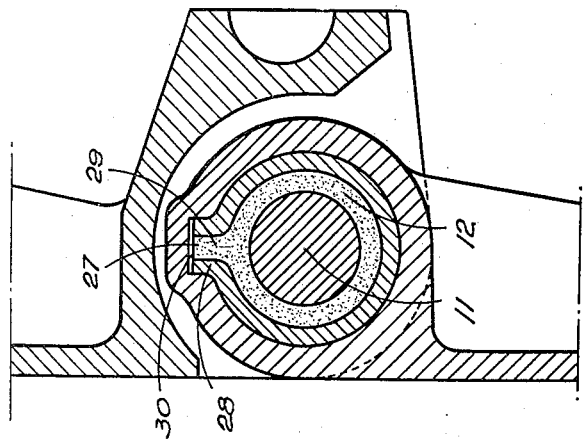

Patented Jan. 23, 1945

2,367,861

UNITED STATES PATENT OFFICE 2,367,861

HINGE JOINT

Max Goldschmidt and José Enrique Moyal, Leicester, England, assignors to Metalastik Limited, Leicester, England, a British company Application April 1, 1943, Serial No. 481,492
In Great Britain January 1, 1942

24 Claims. (Cl. 287—85)

The invention relates to hinge joints in which rubber bushes are arranged around the hinge pin and are disposed in metal shells received in the hinge knuckles, or hinge pin housings, of the joint.

The object of the invention is to contain the rubber of the bushes against flowing or spreading out of the metal shells. A further object is so to contrive the metal shells that they can be contracted to compress the rubber and also to enable them to have keying means cooperating with complementary means in the respective hinge pin housings of the joint.

It is an object of the invention to enable the complete elastic bushing to be driven or forced endwise into place in the housings with the rubber of the bushes placed in compression.

The compressibility of the shell on the rubber and the provision of keying means can both be conveniently taken care of by forming a split, hollow projection, or projections, filled with rubber on each shell, which filled projections, together form an elastic key, or keys, on the complete bushing; but the invention is not limited to this convenient arrangement.

The containing of the rubber in the shells may be carried out for example by inwardly flanging the ends of the shells; but it is preferred to provide rigid separators or spacers between the adjacent ends of the shells even when the latter are flanged-in.

The invention is illustrated in the accompanying drawings as applied to the hinged joints between the component members of endless tracks for endless track vehicles.

Figure 1 is an elevation of a complete elastic bushing ready for insertion in a hinge joint.

Figure 2 is a section on line 2—2 of Figure 1.

Figure 3 is in part a plan of the bushing seen in Figures 1 and 2 and in part a central longitudinal section on line 3—3 of Figure 1.

Figure 4 is an end view of Figure 3.

Figure 5 is a perspective view of one-half of a metallic shell, showing one method of production.

Figure 6 is a hinge joint wtih the complete elastic bushing in place looking at the left hand side of Figure 7.

Figure 7 is a section on line 7—7 of Figure 6.

Figure 8 is in part a fragmentary plan similar to Figure 3 partly in section of another form of the invention.

Figure 9 is a section on line 9—9 of Figure 8.

Figure 10 is an end view looking from the left at Figure 8.

Figure 11 is a section of a hinge joint with the bushing shown in Figure 8 in place therein.

Figures 12 and 13 are sectional detail views of alternative methods of additional fixings for the bushings in the housings.

In the constructional embodiment shown in Figures 1 to 7 the hinge pin is referred to by the number 11; the rubber bush in each case by the number 12, and the metal shells, in which the bushes are disposed, by the number 13. One hinge part of the joint in Figures 6 and 7 is referred to as 14 and the other as 15, 16 being the hinge pin housings or knuckles of the part 14 and 17 the like housings or knuckles of the part 15.

In order that the rubber bushes 12 may be placed under compression we arrange that the metal shells 13 are gapped. This is done in the present embodiment by forming each shell in two semi-cylindrical parts, which are easy to produce by pressing, stamping or casting, and these parts are spaced slightly apart forming gaps 18 when they are assembled around the hinge pin 11 ready for filling with rubber in a suitable moulding operation in which, in the illustrated example, the rubber is securely bonded by vulcanization to the metal of the shells and of the hinge pin.

In this embodiment the rubber is contained in each shell from spreading or flowing out under compressional loads by flanging-in the ends of each shell as at 19, Figures 3 and 5, leaving only a small space between the inner edges of the flanges and the pin, and by closing in the outer walls of the two end shells as at 20 except for a gap 21 corresponding to the gaps 18 between the longitudinal walls of the two half portions of each shell.

It is preferred in addition, to employ rigid, metal washers as spacers 22 passed on to the pin between the ends of the metal shells 13. These are disposed so that the adjacent side faces of the housings 16, 17, surround these washers, see Figure 6. The outside diameter of the washers will be such that they will enter the bore in the joint.

The keying means on the shells for cooperating with complementary means in the various hinge pin housings or knuckles 16 and 17 are conveniently formed by integral, hollow, oppositely-curbed lips 23 projecting outwardly on the metal shells. They are most easily formed at the longitudinal edges of the semicylindrical shell parts and the gaps 18 are then between the lips. By this means, when the shells and the lips are filled with the rubber of the bushes 12, each pair of lips forms a compressible elastic rib or key running along the shell. The two opposed ribs will enter corresponding grooves 24 in the wall of the bore of the housings or knuckles 16, 17, so that the rubber bushes 12 are keyed as well as bonded in proper relation with the housings or knuckles 16, 17 of the joint parts 14, 15. By suitably determining the width of the gaps 18 and the width of the elastic ribs relatively to the bore and the complementary grooves of the housings or knuckles, and by rounding, or otherwise giving a lead to, the ends of the ribs formed by the hollow lips 23 as seen at 25 in Figure 3, the complete flexible bushing may be forced axially into the housings with the shell parts closed together and the rubber bushes 12 under a degree of compression around the pin 11.

When the complete bushing acts as a torsion spring under any relative angular movements of the parts of the hinge in use, this facility for preloading the rubber which the keying means affords enables the spring to sustain greater torsional stresses on the bonding surface of the pin and generally improves the fatigue properties of the rubber.

The preloading thus afforded also relieves the contraction of the rubber liable to be introduced by the vulcanization process, which is the preferred method of connecting the rubber to the metal pin and shells. But the bonding of the rubber bushes to the pin and shells is not essential to all embodiments of the invention, since the elastic bushing may possess advantages, such as its adjustability of the degree of preloading, when the bushing is used as a spring loaded in compression between shells and pin and not secured by surface bonding thereto.

By employing the combination of gapped and lipped shells and rubber bonded between them and on to a common floating pin we are able to mould the bushing in an improved manner by injecting the rubber through the gap into each shell and thereby obtaining a more uniform distribution of the rubber around the hinge pin and within the shell than is possible with an exclusively end feed.

For this purpose as indicated at 26 in Figures 2 and 3 the central part of the longitudinal gap 18 on one face of the complete bushing may be increased in width and this part of the gap will be filled with rubber flush with the extremities of the lips.

In the driving of the complete bushing two features assist: the rigid spacers or washers 22 enable metal to metal contact to be obtained along the shells 13 so that the complete bushing may be driven by a hammer without damage to the rubber and the rounding or tapering of the ends of the lips of the shells as at 25 facilitate entry of each shell into the groove or key way in the knuckle part.

Instead of metal shells which are made as semi-cylindrical parts assembled around the bushes and secured by the bonding of the rubber of the bushes to the interior of the shell parts and to the exterior of the hinge pin, we may make the shells 13 with only a single gap bordered by outwardly bent lips between which the rubber of the bush is moulded. An example of this is shown in Figures 8, 9 and 10 where the gap 27 is left between the lips 28 and the rubber of the bush 12 is moulded between them as indicated at 29. The elastic rib, thus formed, enters the groove 30 in the hinge pin housing or knuckle of the hinge parts see Figure 11. The ends of the lip on the shells are curved or beveled off as at 31 to give a lead for facilitating the entry of the elastic rib or key on each shell with the groove 30.

The end shells are closed at the ends except for a segmental slit 32, while the spacer washers 33 between the shells are employed as in the previous example.

This arrangement is not suitable for heavy loads as the containing of the rubber within the shells is not effective enough at the ends of the single keyway and with heavy loads this containing of the rubber is found to be very important otherwise the rubber bulges out and is destroyed by friction against the intermediate washers owing to the angular movement of the bushed hinge. It may be possible to produce hollow, inwardly projecting lips of the kind shown in Figures 2, 3 and 7 for the single keyway type of shell and bush which would enable this type of bushing to support heavy loads. The lips would then come together under the pressure of forcing the bushing into the housings and close, except for the central part 26 (Figure 3), which is reduced to a narrow slit (compare Figures 2 and 7), which is well within the bore of the housing or knuckle.

Owing to its elastic nature the bushing will retain itself in place for many uses. Two examples are given in Figures 12 and 13 of means for retaining the bushing where necessary. At Figure 12 the hinge pin 11 is continued out through the end shells and is shouldered down at 34 for the turned-in end of the shell to surround it and is again reduced in diameter and fitted with a collar 35 over which the end of the pin can be riveted, or a knock out cotter pin could be provided.

In Figure 13 a dished closure disc 36 is inserted as shown in dotted lines and is knocked into a groove 37 in the housing bore when the bushing is in place.

The invention, while capable of wide application in hinged joints, is especially valuable for the knuckle hinges of the track shoes or members of endless track vehicles such as those employed for military purposes where considerable wear of the hinge pins is experienced owing to the severe friction between the metal surfaces. By eliminating this friction the considerable load imposed by it on the driving power is relieved as well as the wear.

The enclosing of the rubber by the end flanges 19, 20 and end closures of the shells, reinforced by the rigid spacers 22 or 33 prevents its displacement under compression when the bushing is in the bore of the joint and is of advantage in this application, since though the rubber can still work in torsion it is substantially incompressible and will, therefore, support the heavy compressive loads to which these tracks are submitted.

The arrangement has the advantage that as the keyed bushing is inserted in the knuckle housings when the shoes are in line the rubber is relieved of some of the stresses when the knuckles are turned relatively to each other and opposite torques are applied to the bushes, because the pin will adjust itself into a position of static equilibrium in such circumstances, and if the torsional rigidities of the bushes are equal, the rubber will only be twisted through half the angle that would be subtended if the torque were applied between the shell and the pin; but this is a known advantage in elastic bushes of hinged joints for other purposes.

Further advantages of the elastic, contractible, metal-clad bushing arranged in the housings in the hinge parts are: that the elastic properties of the rubber itself operate to maintain the bushing in its place once it has been forced in; that the necessity for accurate machining of the housing bore is obviated; and that the whole arrangement can be knocked out and replaced in service by the use of a hammer if the end of the rubber is protected as described herein.

Rubber when passing from stressed positions through a point where it is under no stress during deflection of the joint is more rapidly fatigued. We can arrange the bushes to have their torsional preloading equal to the amplitude of the torsional oscillation of the joint so that the rubber in its deflection never passes through a zero position. In other words the bushes can be so arranged that in the usual or normal operation of the device any angular movement required would occur between the preloaded position and the position in which there is zero torsion so that there will be no reversal of torsional stresses. This greatly increases the life of the loaded bush.

Further the spacer washers between the shells and bushes allow for inaccuracies in width and lack of coincidence of the intermeshing knuckles of the shoes.

The bushes may be made of rubber of different degrees of hardness where conditions of use would render this advantageous. For example for heavy loaded track shoe joints a fairly hard mix of rubber of say 70 durometer hardness is satisfactory.

The term rubber is intended to apply to natural or synthetic rubber and to rubberlike substances possessing the required characteristics.

We claim:

1. Hinge joint having rubber between the hinge pin and the hinge pin housings, comprising a plurality of rubber bushes corresponding to the hinge pin housings; a plurality of metal shells in which the rubber bushes are received and held against rotation relative to the pin and the shells at the respective interfaces; means for containing the rubber bushes against spreading or flowing out of the ends of the metal shells under heavy loads; and means for preventing rotation of the shells within the housings, comprising longitudinally arranged complementary keys and grooves between the shells and the housings.

2. Hinge joint comprising in combination a plurality of rubber bushes around a hinge pin, a plurality of metal shells in which the rubber bushes are received, the rubber being held against rotation relative to the pin and the shells at the respective interfaces; means for containing the rubber bushes against spreading or flowing out of the ends of the metal shells under heavy loads; said means including end flanges on the shells surrounding the hinge pin and spacer washers secured on the pin between the shells adjacent the said end flanges thereof; a split in each shell whereby it may be contracted on to the rubber, and means for preventing rotation of the shells within the hinge pin housings of the joint in which the shells, bushes and pin are inserted in such a manner that relative rotation between the hinge pin and the housings is wholly taken up by elastic deformation of the rubber bushes.

3. Hinge joint having rubber between the hinge pin and the hinge pin housings, comprising a plurality of rubber bushes corresponding to the hinge pin housings; a plurality of metal shells in which the rubber bushes are received and held against rotation relative to the pin and the shells at the respective interfaces; means for containing the rubber bushes against spreading or flowing out of the ends of the metal shells under heavy loads; and means for preventing rotation of the shells within the housings, comprising a longitudinally arranged hollow key projection on each shell which is split and filled with the rubber of the bush contained in the shell, said hollow key projection in the shells co-operating with a groove in the hinge pin housings.

4. Hinge joint as claimed in claim 3, in which the hollow projection of the bush-containing shells have median portions of the crevice or split large enough to provide commodious passages for injecting the rubber into the shells and around the hinge pin therein.

5. An elastic pivot bushing unit for a hinge joint comprising in combination a hinge pin to which a plurality of rubber bushes are bonded; a number of split metal shells enclosing the bushes and having means for keying them against rotation in the hinge joint housing for which the bushing is intended, the shells being contrived to contain the rubber bushes against flowing or spreading out at the ends thereof.

6. A complete keyed elastic pivot bushing unit for a hinge joint comprising in combination; a hinge pin; a plurality of rubber bushes bonded to it; a number of metal shells enclosing the bushes and to which the rubber of the bushes is moulded; hinge parts having housings receiving the shells, elastic keying means formed by the bushes and shells for co-operating with the housings on the hinge parts; metal separators around the pin and between adjacent ends of the bushes, and end closure means for the end shells beyond the ends of the hinge pin, the bushing being capable of being readily driven into place in the housings of the hinge parts.

7. Knuckle hinge joints between adjacent track shoes of endless tracks for vehicles having rubber between the hinge pin and the knuckle housings of the joint, comprising in combination a series of rubber bushes bonded on the hinge pin and separating washers between them, a series of metal shells enclosing the bushes to which the rubber on the peripheral surface of the bushes is bonded, the intermediate shells being made as two semi-cylindrical pressings with annular end flanges and with opposed hollow rib-like projections, and the end shells being formed as similar pressings but with the end that will be outermost in the hinge joint made half circular instead of annular so that said hinge pin and its bushes are completely enclosed by the shells and the spacing washers.

8. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, means for preventing turning of each shell relative to its housing, and means containing the rubber at the ends of the shells so as to prevent the rubber from spreading or flowing out of the ends of the shells when the rubber is under heavy load.

9. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, said shells being split longitudinally of the pin so as to be contractible about the rubber bushes, and means for preventing rotation of the shells within the housings including interengaging portions on the shells and housings which are engageable with each other upon endwise insertion of each shell into its housing.

10. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, said shells being split longitudinally of the pin so as to be contractible about the rubber bushes, and means for preventing rotation of the shells within the housings including interengaging portions on the shells and housings which are held in engagement through compression of the rubber bushes so that relative rotation of the pin and housings is wholly taken up by elastic deformation of the bushes.

11. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, and means for preventing rotation of the shells relative to the housings and comprising a longitudinally split bead on each shell and a groove in the housing wall around the shell and which receives the bead.

12. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, and means for preventing rotation of the shells relative to the housings and comprising an outwardly pressed bead on each shell which is longitudinally split so as to provide a longitudinal gap permitting contraction of the shell and narrowing of the bead, said bead being received within a groove in the housing wall around the shell.

13. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, and means for preventing rotation of the shells relative to the housings and comprising an outwardly pressed bead on each shell which is longitudinally split so as to provide a longitudinal gap permitting contraction of the shell and narrowing of the bead, said bead being received within a groove in the housing wall around the shell and being normally slightly wider than the groove so that the shell is contracted and the bush is under compression when the bead is in the groove.

14. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, and means for preventing rotation of the shells relative to the housings and comprising an outwardly pressed bead on each shell which is longitudinally split so as to provide a longitudinal gap permitting contraction of the shell and narrowing of the bead, said bead being received within a groove in the housing wall around the shell and being normally slightly wider than the groove so that the shell is contracted and the bush is under compression when the bead is in the groove, the bead having a tapered end to facilitate contraction of the shell and bead as the bead is inserted into the opening in the housing.

15. A hinge joint comprising a pin, a plurality of pin receiving housings having openings receiving the pin, a plurality of rubber bushes around the pin and bonded thereto in end next to end relation with the bushes respectively received in the housing openings, a metal shell in each opening and receiving and being bonded to the bush thereon, a longitudinally extending keying means of hollow character on each shell which is filled with rubber integral with the bush, and keying means on each housing engaging the keying means on the shell, the keying means on the shell being split in such manner that it is compressed when the shell is inserted into its opening whereby the rubber is preloaded and able to sustain greater torsional stresses on the rubber bonds.

16. A hinge joint comprising a pin, a plurality of pin receiving housings having openings receiving the pin, a plurality of rubber bushes around the pin and bonded thereto in end next to end relation with the bushes respectively received within the housing openings, metal shells in the openings respectively and receiving and being bonded to the bushes, and means for connecting each shell to its housing and comprising a keyway in the housing wall and a pair of outwardly bent, longitudinal lips on the shell projecting outwardly into the keyway, said lips being curved towards each other at their outer edges to form an enclosing hollow and split rib or bead and the rubber of the bush being molded into said bead so as to form a compressible elastic key, said key being compressed when in the keyway so that the edges of the lips are brought into closer relation.

17. A hinge joint comprising a pin, a plurality of pin receiving housings having openings receiving the pin, a plurality of rubber bushes around the pin and bonded thereto in end next to end relation with the bushes respectively received within the housing openings, metal shells in the openings respectively and receiving and being bonded to the bushes, and means for connecting each shell to its housing and comprising a keyway in the housing wall and a pair of outwardly bent, longitudinal lips on the shell projecting outwardly into the keyway, said lips being curved towards each other at their outer edges to form an enclosing hollow and split rib or bead and the rubber of the bush being molded into said bead so as to form a compressible elastic key, said key being compressed when in the keyway so that the edges of the lips are brought into closer relation and each shell having inturned end flanges for substantially closing the gap at the ends of the lips.

18. A hinge joint including a hinge pin, a plurality of rubber bushes on the pin and disposed in end next to end relation, a plurality of metal shells receiving the bushes respectively, means for holding the rubber at the surface of the pin and at the inner surface of the shells against rotation relative to such surfaces, a plurality of hinge housings having openings respectively receiving the shells, means for preventing turning of each shell relative to its housing, and metal spacing washers around the hinge pin closing the adjacent ends of the shells and establishing metal to metal contact between the shells so that the pin, bushes, and shells as a unit may be driven into the housing openings without damaging the rubber.

19. In an endless track of track shoes having knuckle hinges between the shoes, a hinge pin, rubber bushes on the pin and bonded thereto, a metal shell around each bush and bonded thereto, knuckle housings having openings receiving certain of the shells respectively, and longitudinally extending key means on the shells and housings so that each shell may be assembled by endwise insertion into its housing, the assembly being characterized by the fact that non-torsioned assembly of shells, bushings and pin is inserted into the housings when the shoes are in line, whereby a predetermined torsion condition is obtained when the track shoes have hinging action in use.

20. A hinge joint having limited hinging movement comprising a pin, a series of rubber bushes on the pin in end next to end relation bonded thereto, a metal shell around each bush and bonded thereto, a hinge knuckle housing receiving certain of the shells, a second hinge knuckle housing receiving certain of the remaining shells, and means for connecting the shells to the housings for turning therewith, said rubber being under a torsional preloading at least equal to the amplitude of torsional oscillations during normal relative hinging of the housing parts so that the rubber during such hinging action does not pass through a zero stress condition.

21. In a hinge joint, a metal shell for containing a rubber bush, said shell comprising two semi-cylindrical metal elements having end flanges for confining the ends of the bush, the end flanges having recesses for receiving a hinge pin and the shell elements each having a hollow lip projecting radially along each longitudinal edge.

22. An article of manufacture for use in a hinge joint comprising a pin, a plurality of rubber bushes in end next to end relation on the pin and bonded thereto, and a metal shell around each bush and bonded thereto, said shell being split longitudinally and the metal at opposite sides of the split being outwardly pressed to form a hollow, longitudinally extending metal bead for locking the shells in housings therefor.

23. An article of manufacture for use in a hinge joint comprising a pin, a plurality of rubber bushes in end next to end relation on the pin and bonded thereto, and a metal shell around each bush and bonded thereto, said shell being split longitudinally, and outwardly directed projections on each part of the shell at opposite sides of the split for engagement with recesses in hinge housings for resiliently keying the shells to the housings.

24. An article of manufacture for use in a hinge joint comprising a pin, a plurality of rubber bushes in end next to end relation on the pin and bonded thereto, and a metal shell around each bush and bonded thereto, said shell being split longitudinally, at diametrically opposite points, and outwardly directed projections along each side of the shell at opposite sides of the split for engagement with recesses in hinge housings for resiliently keying the shells to the housings.

MAX GOLDSCHMIDT.
JOSÉ ENRIQUE MOYAL.